Dec. 27, 1932.   C. E. HENRIOD   1,892,616
POWER TRANSMISSION MECHANISM
Filed Dec. 30, 1930   9 Sheets-Sheet 2

INVENTOR:
C. E. Henriod
BY: Marks & Clerk
ATTORNEY

Dec. 27, 1932.                    C. E. HENRIOD                    1,892,616
                          POWER TRANSMISSION MECHANISM
                       Filed Dec. 30, 1930          9 Sheets-Sheet 3
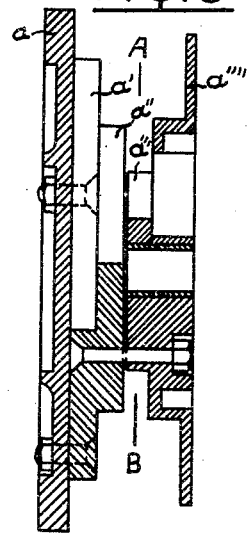
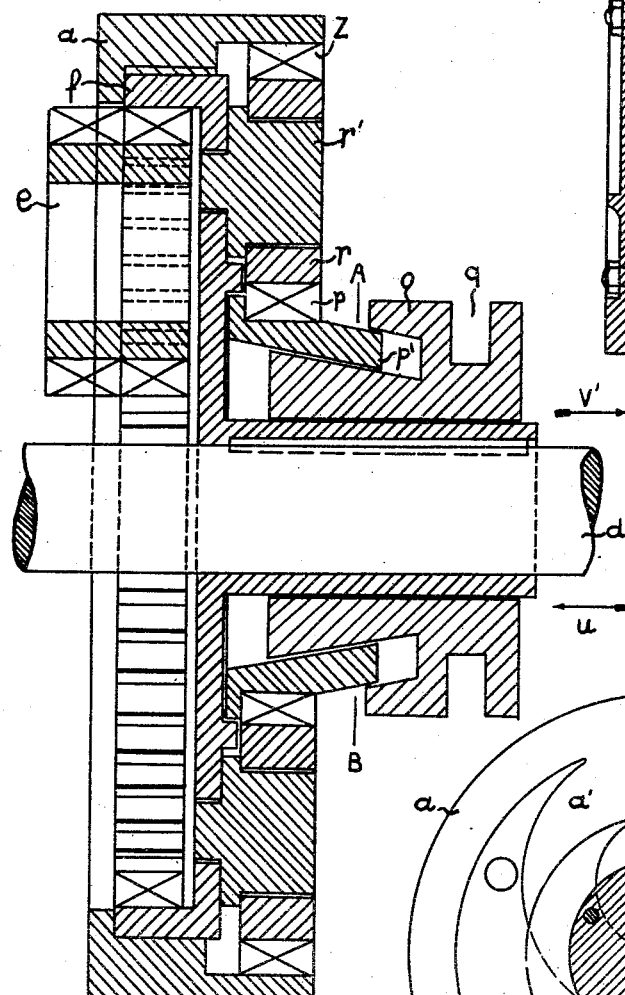
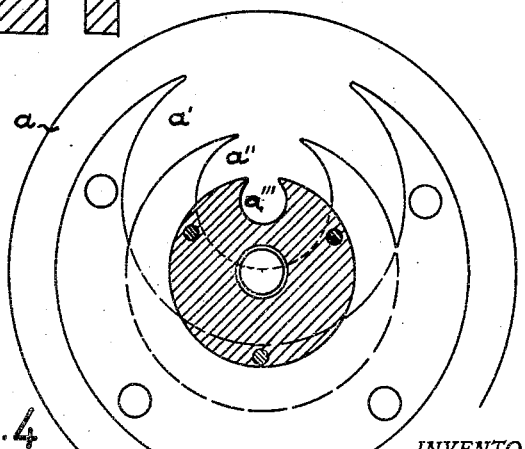
INVENTOR
C. E. Henriod
BY Marks Klein
ATTORNEY

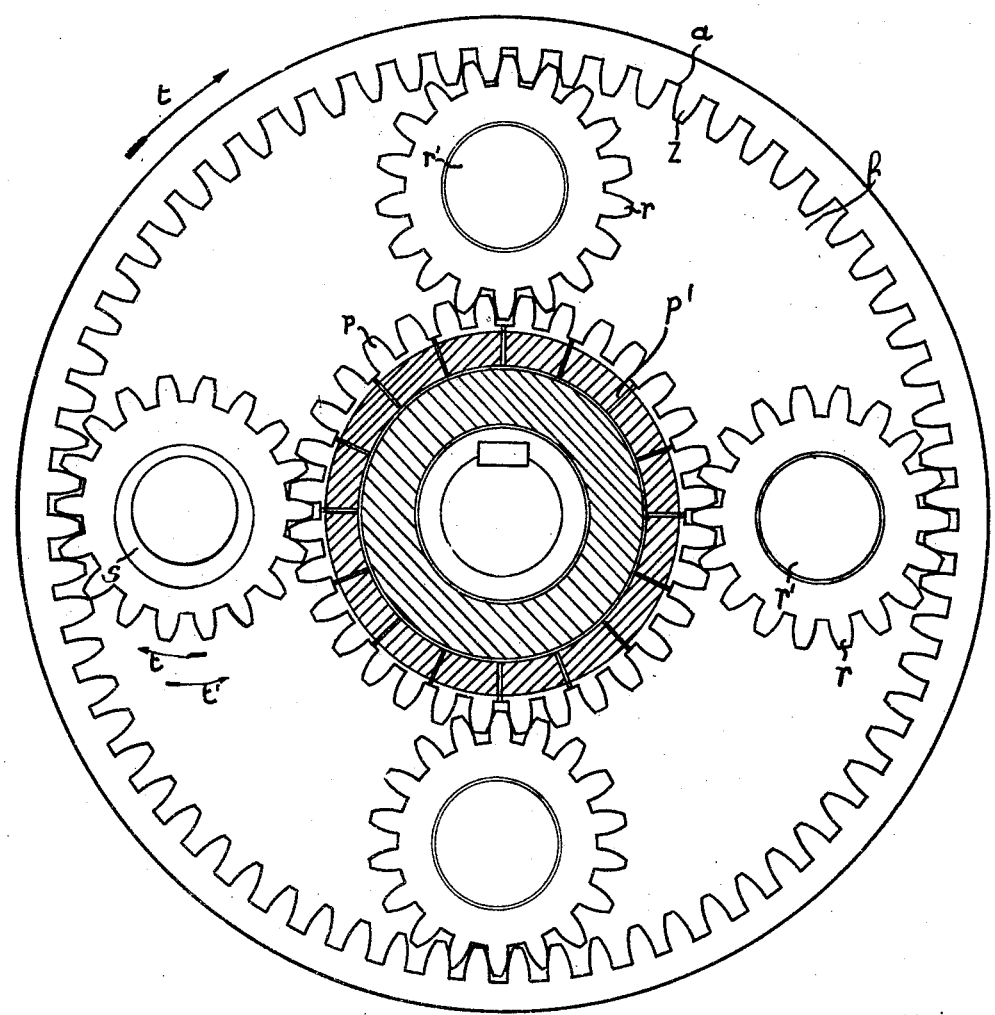

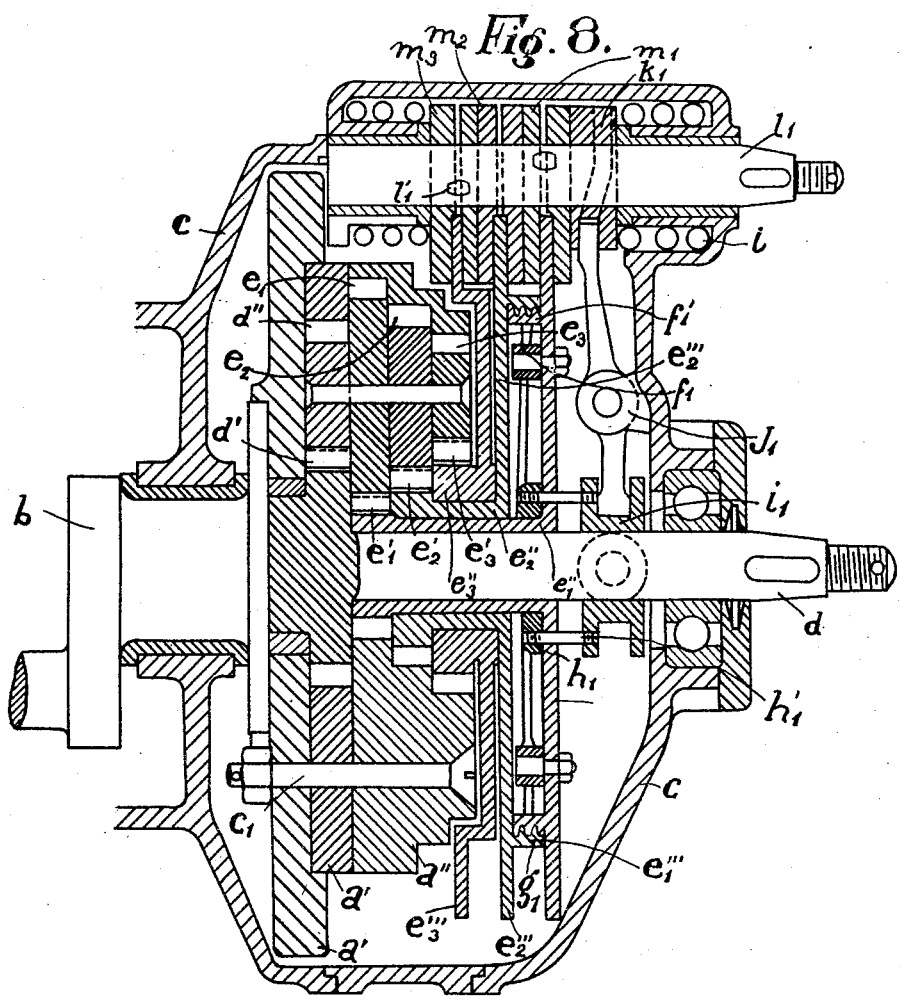

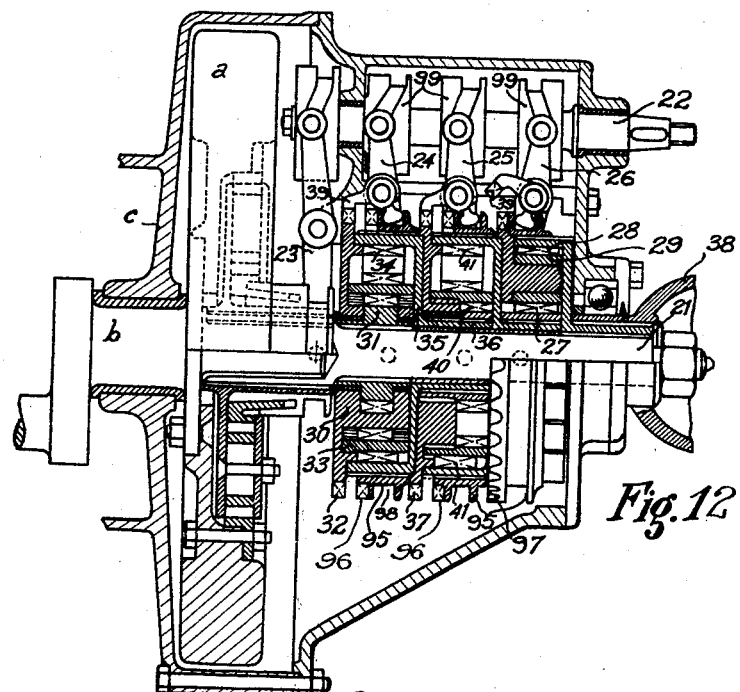
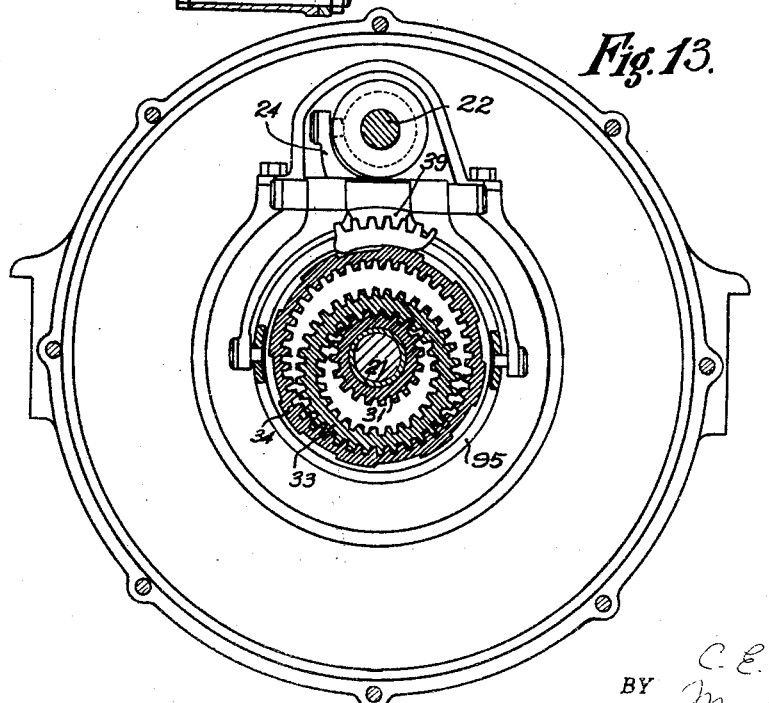

INVENTOR
C. E. Henriod
BY
ATTORNEY

Patented Dec. 27, 1932

1,892,616

UNITED STATES PATENT OFFICE

CHARLES EDOUARD HENRIOD, OF AREUSE, SWITZERLAND

POWER TRANSMISSION MECHANISM

Application filed December 30, 1930, Serial No. 505,595, and in France January 7, 1930.

This invention relates to power transmission mechanism and more particularly to mechanism of this kind which is combined with the flywheel of a motor.

It is an object of the invention to provide a variable speed transmission mechanism in which the different transmitting gear pairs are permanently meshing with each other so as to avoid the use of a gear shift mechanism and the well known grinding noise when shifting gears to change from one speed to another.

It is a further object of the invention to provide internal gearing for the transmission of power from the driving shaft to the driven shaft in order to obtain silent intermediary speeds.

A further object is the provision of a single operating shaft which is rotatably mounted in the transmission casing, the rotation of this shaft controlling the means whereby various speeds are attributed to the driven shaft.

These and other objects will be apparent from the following description and the accompanying drawings illustrating different types of power transmitting mechanism according to the invention and in which, Figure 1 shows a mechanism in section through the axis of the coaxial driving and driven shafts.

Figure 3 is a section through the flywheel on which the mechanism is mounted and of the members secured thereto to form a single structure.

Figure 4 is a section along the line A—B of Fig. 3.

Figure 6 is a modified form of power transmitting mechanism shown in axial section.

Figure 7 is a section along the line A—B of Fig. 6.

Figures 8 and 9 are axial and transverse section through a third form of construction of a power transmission mechanism according to the invention.

Figure 10 shows a detail part of this form of construction.

Figures 12 and 13 are axial and transverse section through a fourth form of construction.

The forms of construction shown in Figures 1 to 5 and 8 and 9 comprise pairs of toothed wheels which are constituted on the one hand by wheels keyed to the same planetary shaft driven by the coaxial driving or driven shafts, and on the other hand by toothed wheels having the same axis as these shafts, namely central wheels, which are constantly in mesh with the said keyed wheels and one of which being secured to that of the two shafts which does not carry the planetary wheels, while the others are guided in the material itself of the shaft which carries the planetary wheels, the latter being adapted to be immobilized by brakes operated by means of an operating shaft and acting on friction plates secured to those wheels, the operating shaft being adapted to connect the driving shaft and the driven shaft for rotation one with the other.

Figures 9, 10:
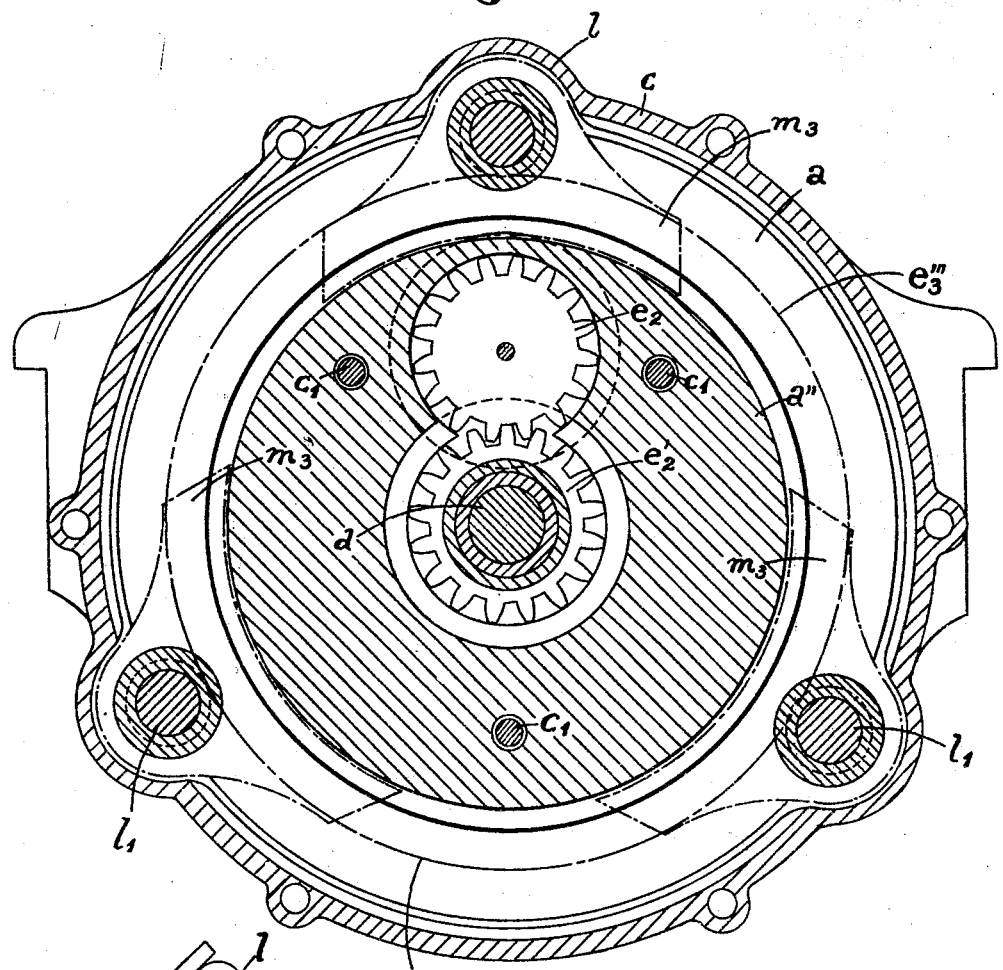

In the forms of construction shown in Figs. 1 to 5 the mentioned central wheels are interiorly toothed rings while in Figs. 8 and 9 they are exteriorly toothed wheels.

In Figs. 1 to 5, $a$ indicates the flywheel on which the mechanism is mounted and which is assembled with the parts $a'$, $a''$, $a'''$, $a''''$, when all the wheels are mounted thereon. These various parts are clearly visible in Figs. 3 and 4. It is seen that by superposition of these various parts which are suitably cut out, there are provided segment-like recesses for guiding with their interior surfaces, the exterior of the toothed wheels visible in Fig. 1 and indicated by $e'$, $e''$, $e'''$, $e''''$.

$b$ is the crank shaft of a motor and $d$ is the driven shaft to which the resistance is applied which the motor has to overcome. $c$ is the casing which encloses the transmission mechanism mounted on the flywheel $a$ and which may be made integral with the crank case of the motor. The wheels $e'$, $e''$, $e'''$, $e''''$ are keyed to a common shaft $e$ or bolted together. $f', f'', f'''$ indicate interiorly toothed rings which are guided by their gear on the exterior circular surfaces of the segments shown in Fig. 4, while the wheels $e', e'', e'''$ are guided within hollow segments of the same figures, these hollow segments having a common eccentric axis so that the wheels $e', e''$, etc. form a planetary block. A disc $f$ is secured to the shaft $d$ and provided with an interior gear meshing with the planetary wheel $e''''$. The rings $f', f'', f'''$ are in mesh with the wheels $e', e'', e'''$ respectively.

Figure 2:
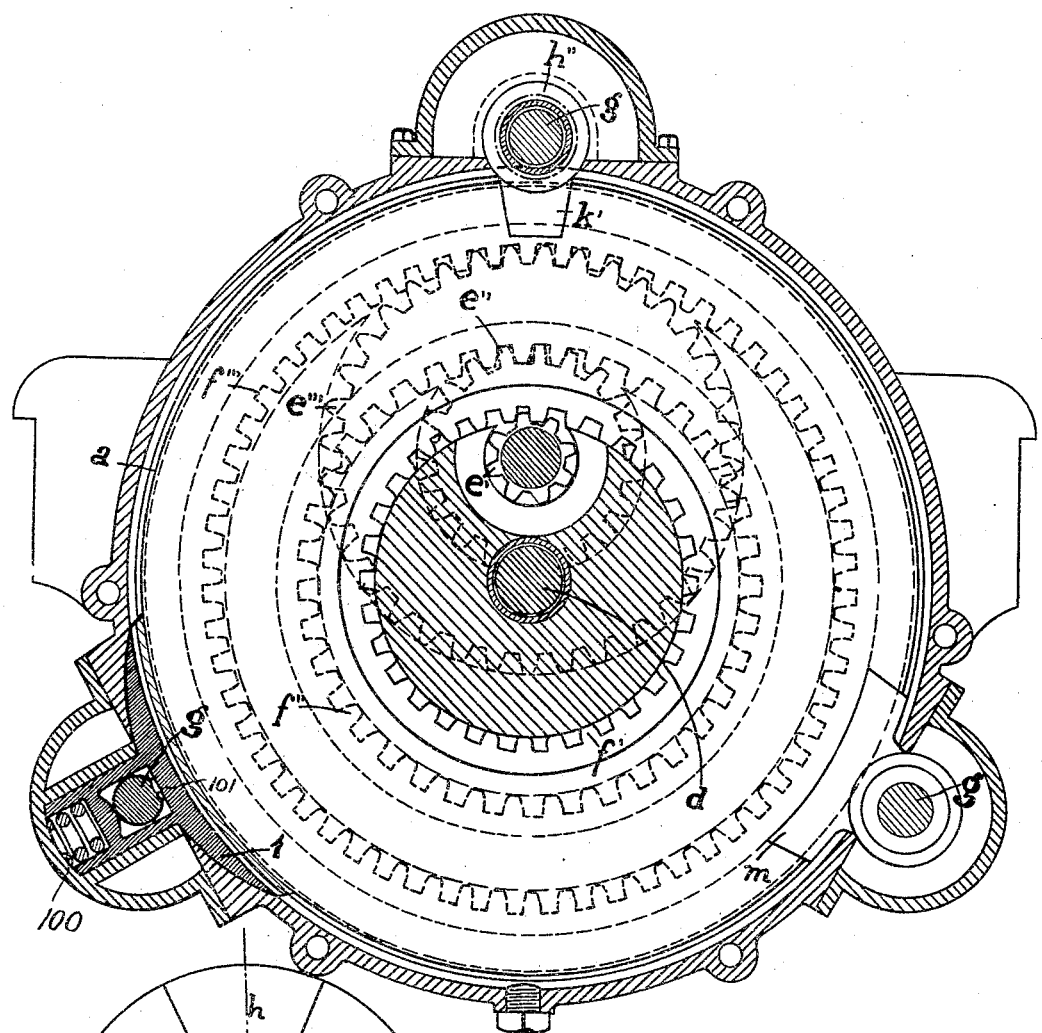
Figure 2 is a section along the line A—B of Fig. 1.
Figure 5:
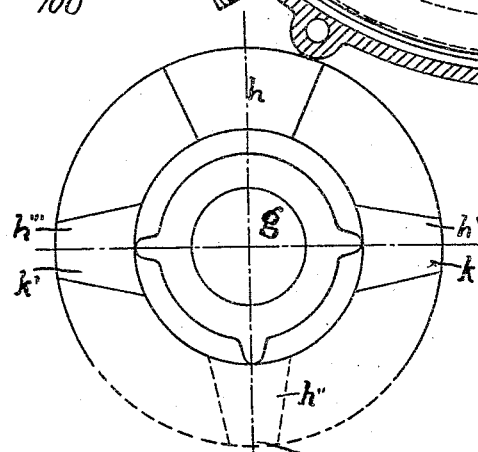
Figure 5 is a plan view of a detail part.

In the crankcase $c$ are mounted three operating shafts $g$ which are so interconnected that the same movement may be simultaneously imparted to them. Figure 2 shows however three different forms of operating mechanism; but in a practical embodiment there would be the same mechanism provided for the three shafts. The three represented examples show means to exert a braking action on the thin discs $j', j'', j'''$ secured to the central rings $f', f'', f'''$ respectively for braking any one of the rings independently of the others.

For this purpose there are provided, for the methods of braking as represented at the top and on the right side of Figure 3, pairs of circular rings $w', w'', w'''$ disposed freely in the casing and on either side of the discs $j', j'', j'''$. In order to tighten the discs $j$ between the rings $w$, rings $h', h'', h'''$ may be disposed on the shaft $g$, these rings being provided with tightening jaws $k', k'', k'''$ for the ring pairs $w$. A spring $i$ may be provided on either side of the group of rings $h', h'', h'''$ to furnish the necessary tightening force when cams which are suitably arranged on the operating shaft release the said jaws to be acted upon by the spring.

Figure 1:
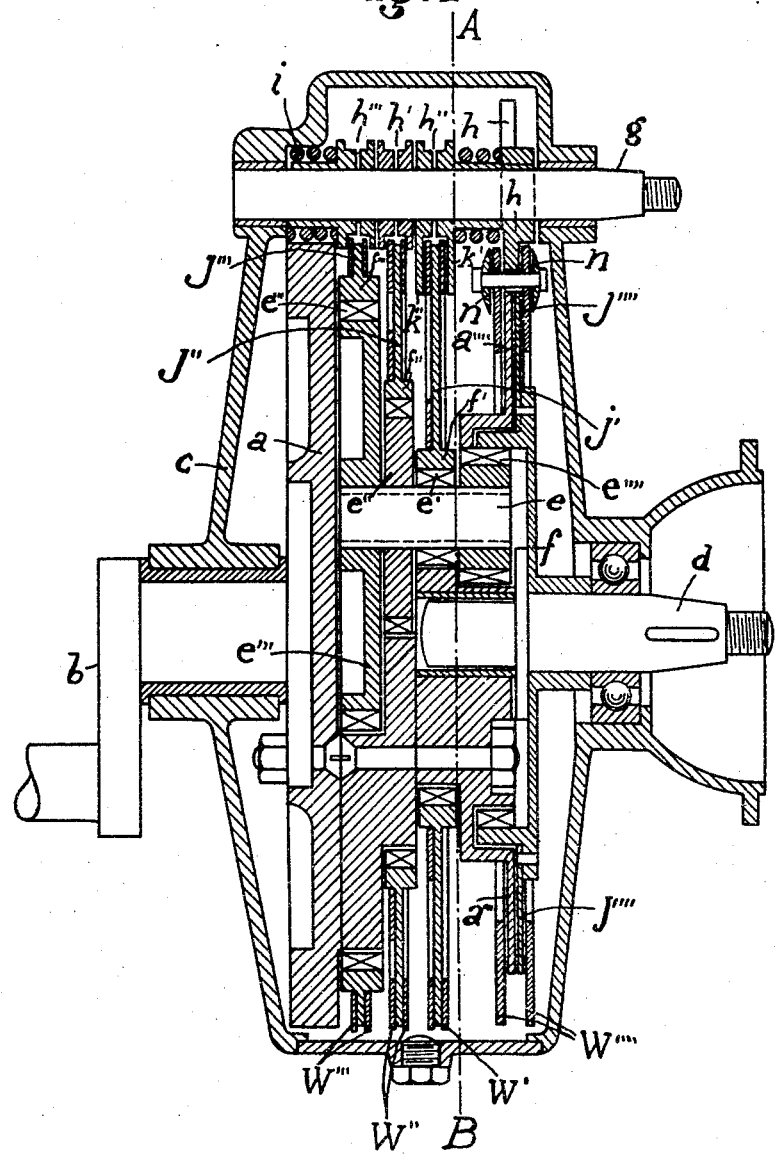

The Figures 1 and 3 show that a thin disc $a''''$ is integral with one of the members carried by the flywheel and a thin disc $j''''$ is riveted to the wheel $f$. Rings $w''''$ are disposed on either side of the discs $a''''$ and $j''''$ but are prevented from clamping the two discs against each other by the cam $h$ when this cam is introduced between the two rings and prevents the two resilient washers $n$, which are maintained under tension by a bolt, to exert their clamping action upon the rings $w''''$.

The cam $h$ is suitably recessed and when the recessed portion is brought between the two washers $n$, these latter are free to exert pressure on the rings $w''''$ thus tightening the discs $a''''$ and $j''''$ together.

The manner of operation of the described mechanism is the following: There exists a position for the operating shafts $g$ where the discs $j''''$ and $a''''$ are not pressed against each other and also none of the pairs of rings $w', w'', w'''$ presses upon the gears $f', f'', f'''$. The driving shaft then rotates with no load but turns the shaft to which the planetary wheels are keyed. Since one of these wheels, the wheel $e''''$, meshes with the gear $f$ carried by the shaft $d$, this wheel effects a movement of rotation owing to the fact that the shaft $d$ is ordinarily subjected to a considerable resisting torque. The entire planetary block turns therefore about its axis and each of the planetary gears communicates to its corresponding gears $f', f''$, or $f'''$ a certain speed of rotation, while the rims $j', j'', j'''$ are not subjected to a braking action.

When it is assumed that the cam $h$ is turned to release the brake $n, w''''$ it is seen that with the locking of the discs $j''''$ and $a''''$, a disposition is obtained which corresponds to what is known as direct drive in automobiles.

It will be understood that the members which are not illustrated and by which the shaft $g$ operates the various brakes can be arranged on the shaft in such a way, that the brakes are successively released one after the other, one of the brakes being loosened while the other is tightened.

For all other speeds of the shaft $d$ than those which it can take during direct drive, it is necessary that one of the gears $f', f'', f'''$ is immobilized by its corresponding brake. Referring to Fig. 2 it is then seen that when one of the gears $f', f'', f'''$ is fixed and when the shaft of the planetary wheels turns in clockwise direction the corresponding planetary wheel turns in opposite direction. It is then this planetary wheel that turns the gear $f$ of the driven shaft. The ratio $\frac{e'''}{f}$ is constant and for instance equal to $1/3$. If the ratio between the fixed gear and its corresponding planetary wheel is exactly 3, there exists exact compensation between the speed of the shaft of the planetary wheel and the speed of the wheel about the shaft in opposite direction which it has the tendance to communicate to the gear $f$. When the ratio between the fixed gear and its planetary wheel is greater than 3, the driven shaft takes a speed in opposite direction to the speed of the driving shaft. When the ratio between the fixed gear and the planetary wheel is smaller than 3, there is obtained a positive speed of the driven shaft which can be very much reduced relative to the speed of the driving shaft when this ratio is but little smaller than 3. In the example shown in Fig. 2 the greatest ratio between one of the gear rings and its planetary wheel is obtained with that gear pair having the smallest planetary wheel. Backwards drive is therefore obtained by employing the brakes $h''$ immobilizing the gear $f'$ which meshes with the wheel $e'$, the ratio between these two gears being greater than 3 and in this example having a value of about 4 to 1. In order to pass to the first and second speed, the brakes $h'$ and $h'''$ are successively put in action.

This mechanism has the advantage of a silent rotatable operation means as well as silent intermediary speeds owing to the superiority of the internal gears over external gears as also to the manner of guiding the wheels on the flywheel.

The brake construction given as modification in Fig. 2 has a brake shoe 1 adapted to act on the discs $j'$, $j''$, $j'''$ when being applied to the external circumference of these discs. A spring 100 is placed between the casing and the brake shoe to act on the shoe which has a predetermined stroke by means of the shaft $g$ journalled in the casing. The shaft is provided with a notch 101 which enables the brake shoe to make an inward movement when this notch is turned towards the spring. At the right hand side of Fig. 2 the letter $m$ indicates a modified form of tightening jaws as have been previously described.

In Figures 8 and 9 a form of construction is described in which the central gears are not internal gears, but external gears placed one over the other and over the driven shaft $d$. Here the wheel $d'$ is connected to the driven shaft and meshes with the planetary wheel $d''$. The planetary block and the brakes are arranged as in Fig. 1 with the exception of the braking device for obtaining direct drive. This drive is not obtained by direct assembly of the shaft $d$ with the flywheel $a$, but by the assembly of two central wheels of different diameter and which wheels being prevented therefore to be turned at different speeds by their respective planetary pinions, prevent the planetary block to turn about its axis, so that it turns the wheel $d'$ and the two assembled wheels with the speed of its revolution which is that of the driving shaft.

The planetary wheels $e_1$, $e_2$, $e_3$ are in mesh with the central wheels $e_1'$, $e_2'$, $e_3'$. These central wheels are assembled by means of sleeves $e_1''$, $e_2'''$ and $e_3''''$ which cooperate with brakes such as have been described with reference to Fig. 1. The above mentioned assembly between the two wheels for direct drive is made between the two adjacent plates $e_1''''$ and $e_2'''$.

For this purpose the disc $e_1'''$ carries levers $f_1$ connected to brake segments $f_1'$. These segments cooperate with a channeled internal surface of a ring $g_1$ integral with the disc $e_2'''$. A sleeve $h_1$ having a bevelled face can slide along the sleeve $e_1''$ and forms a cam for the ends of the levers $f_1$. Rods $h_1$ connect the sleeve $h_1$ to a sliding ring $i_1$ operated by a lever $j_1$ of which the position is dependent on the cam $k_1$ keyed to the operating shaft $l_1$.

It will be understood that the various operating means on the shaft $l_1$, such as the cam $k_1$ and projections $l_1'$ can be arranged on the shaft so as to come successively into action and in such an order that for instance the rotation of the shaft $l_1$ always in the same direction makes the shaft pass successively through positions to which correspond the following movements of the shaft $d$; a reverse speed, a no load speed, a first and second intermediary speed and a speed corresponding to direct drive.

Figure 9 is a section on a plane along the face of the two gears $e_2$, and $e_2'$, showing the shape of the tightening jaws $m_3$.

It is seen that these wheels can be guided along their periphery in the material of the member $a''$ of the flywheel when the central wheels have more play on their sleeves and on the shaft $d$ than in the recesses of the member $a''$. The three parts $a$, $a'$, $a''$ of the flywheel are assembled by means of bolts $c_1$.

Figure 11:
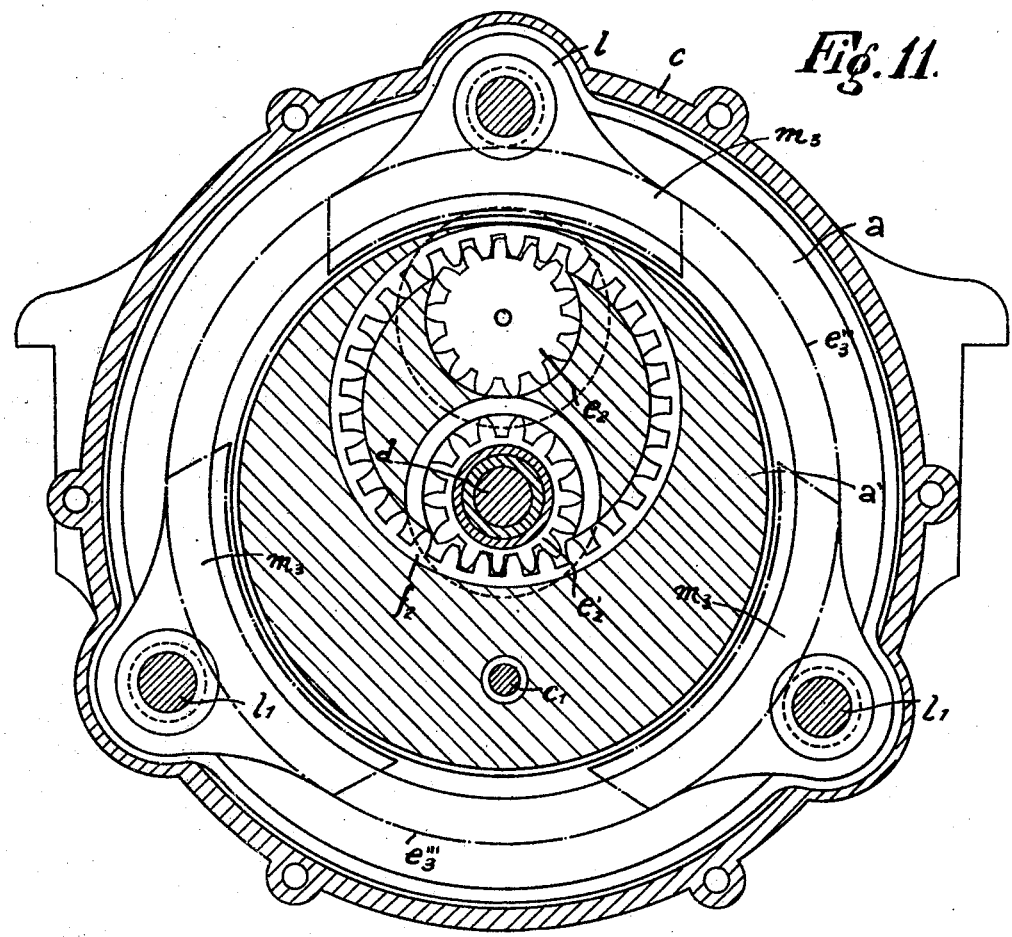
Figure 11 is a transverse section through a modification of the arrangement according to Figures 8 and 9.

Figure 11 is a modification of the form of construction shown in Figs. 8 and 9. The planetary gears and the central gears are operatively connected by means of internal gear rings $f_2$ which can also be guided in the material of the flywheel and which have the advantage to provide silent internal gearing.

Figures 6 and 7 illustrate a clutch mechanism which can be applied to two coaxial shafts and which comprises an internal gear mounted on one of the shafts and a disc secured to the other shaft. This clutch mechanism can be used with a change speed gear according to Figs. 1 and 2.

In Fig. 6 this disc is constituted by the wheel $f$ meshing with the pinion $e''''$. This disc carries planetary pinions $r$, guided on cores $r'$. These planetary pinions mesh with the interior gear $z$ and with a central extensible pinion $p$. This pinion is formed by a plurality of sectors as is also its hub $p'$, each sector extending over two teeth. This hub is provided with conical surfaces which, owing to the fact the hub is split, can be introduced into a conical groove provided in a sleeve $o$ which can slide along the shaft $d$. This sleeve is provided with a groove 9 adapted to engage an operating lever.

The manner of operation of this mechanism is the following: When the sleeve $o$ is operated in the direction of the arrow $u$, the extensible pinion $p$ receives its smallest diameter for which its engagement with the planetary pinions is correct. There exists then between the shaft $d$ and the shaft $b$ no other connection than that which results from the unavoidable friction between the correct meshing gears. The resisting torque applied to the shaft $d$ makes the planetary wheels turn about their axes when the flywheel $a$ is rotated and drives the pinion $p$ and the sleeve $o$, which is loosely mounted on the hub of the wheel $f$ keyed to the shaft $d$, in opposite direction. When the sleeve $o$ is operated in the direction of the arrow $v'$, the full conical surface of the sleeve $o$ forces the split frustoconical part of the hub to adopt its largest diameter. From this it results first that the engagement of the gears $p$ and $r$ becomes incorrect, and this in a progressive manner when the sleeve o is pulled slowly. There will arrive a position where the planetary pinions will not turn any more about their axes. Then as these pinions do not rotate, they drive their cores or guides r' and therefore the disc f keyed to the shaft d. In this manner direct drive is obtained.

Instead of being guided by cores, the planetary pinions could be guided along their circumference by recesses made in the disc f.

Figure 7 shows for one of the planetary wheels another means to render the engagement of the gears p and r incorrect and which does not require making the pinion p extensible. This means consists in an eccentric sleeve s permitting to approach the two gears or to move them away from each other.

The construction according to Figs. 12 and 13 is also provided with permanently meshing gears. They are operated here by a clutch which is independent of the gears. The flywheel a of the motor carries a clutch mechanism as has been described with reference to Fig. 6 and which permits to unite the shaft b to a shaft 21 by means of a cam shaft 22 controlled by a lever 23. The control of the speed changes is obtained by levers 24, 25 and 26.

Several transmission elements are successively mounted on the shaft 21, each element comprising the following members: A central pinion and an internal gear of the same axis are connected to each other by an interiorly and exteriorly geared crown which engages with its interior gear the pinion and with its exterior gear said internal gear. Figure 12 shows two such elements and a third one which comprises a pinion 27 and an internal gear crown 28 connected to the pinion 27 by means of a planetary pinion 29. The central pinion 31 of the first element is keyed to the shaft 21.

An eccentric core 30 having a gear 32 is loosely mounted on the shaft 21 and surrounding both faces of the pinion 31. The crown 33 is guided on this core 30 by its internal gear. The internal gear 34 is integral with a disc 35 and a sleeve 36. To this sleeve is keyed the central pinion 40 of the second element and an eccentric core provided with a gear 37 is loosely mounted on a portion of the hub of the pinion 40. Any number of such elements can be disposed on this shaft 21 and to each of these elements corresponds a predetermined ratio of reduction between the speed of the central pinion and that of the internal gear.

In the illustrated example the sleeve of the second internal gear 41 has the planetary pinion 27 keyed thereon. The sleeve of the internal gear 28 of the planetary train is connected to a sleeve 38 adapted to be coupled with the driven shaft.

Each of the internal gears 34, 41 and 28 carries a ring 95 which turns with its corresponding internal gear but which can slide in axial direction relative to the gears. Each of these rings 95 is provided with a gear 96 adapted to engage with the gears 32, 37 and 97. The rings 95 are provided with a circular groove 98 which has two functions, to engage the ends of the levers 24, 25 and 26, respectively and to transmit the sliding motion imparted by these levers to the rings 95 to the pawls 39.

The manner of operation of this mechanism is the following.

The cams 99 on the shaft 22 are adjusted relative to each other so that by turning the shaft one passes from reverse drive to no speed and then to the various positive speeds, first to the slower and then to the faster speeds. For reverse drive it is necessary that the lever 23 couples the shaft 21 with the flywheel a and then that the levers 24 and 25 place the corresponding two pawls 39 in the position represented in Fig. 12 and that the lever 26 brings its corresponding pawl 39 in engagement with the gear 97. The gears 32, 37 and 97 are then immobilized. The pinion 31 then communicates a reduced speed to the internal gear 34 which transmits its movement without a change to the pinion 40 which transmit a further reduced speed to the gear 41.

This latter turns the pinion 27 which communicates a rotation in opposite direction to the gear 28 by means of the planetary pinion 29. In order to pass to no speed position it is sufficient to disengage the shaft 21 by means of the lever 23 and for first speed the lever 26 is brought into its position represented in Fig. 12 disengaging the pawl 39 from the gear 97. The ratios of reduction of the two first transmission elements are then multiplied one by the other. To pass to the second speed only one of the elements has to be left in action by sliding the ring 95 and raising the pawl 39 of that element which should not function. The third speed is obtained by that of the elements which gives the smallest ratio of gearing which is in the present example the first element. The direct drive is obtained by interconnecting all transmission elements by means of the rings 95 raising the levers 39, so that all elements turn together. It will be seen that two transmission elements will furnish four speeds.

Figure 14:
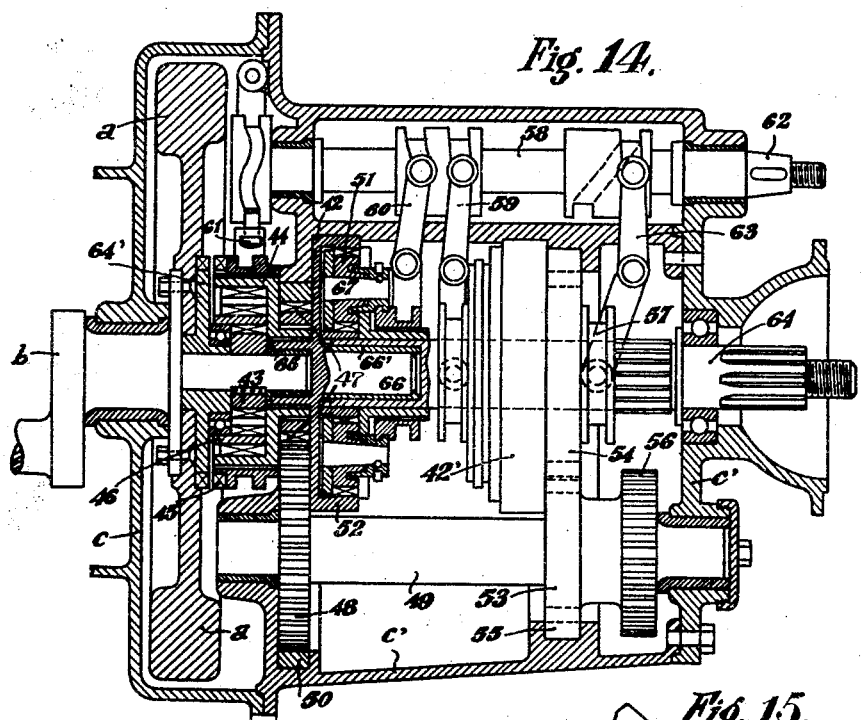
Figures 14 and 15 are axial and transverse section through a fifth form of construction.
Figure 15:
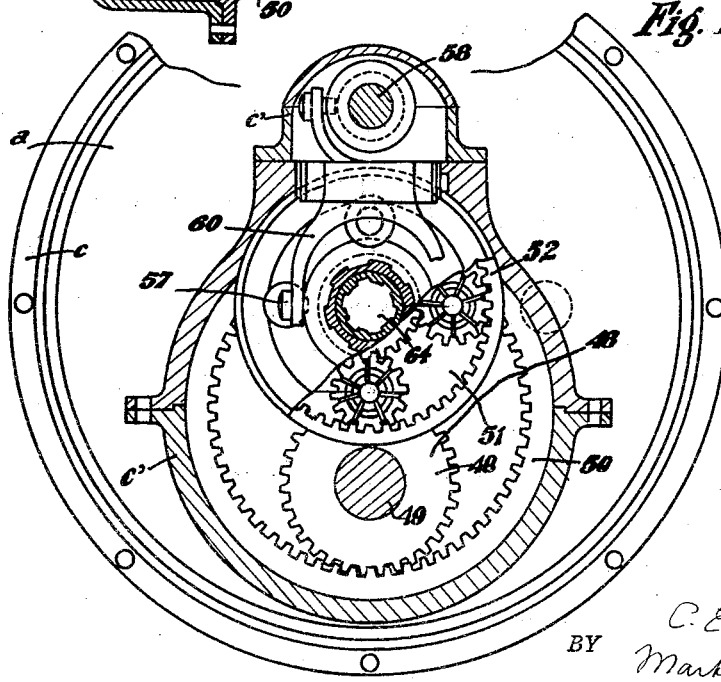

In the form of construction illustrated in Figures 14 and 15 there is arranged a single element similar to the elements just described, this element being placed in proximity of the flywheel. The element ensures a first speed reduction between the flywheel a and a disc 42 carrying an internal gear of a coupling mechanism with extensible pinion as has been described before. This mechanism differs from the one previously described in that here the planetary pinions 51 are extensible. An identical mechanism 42' is represented not in section and is controlled by the lever 59 and turned in opposite direction than the disc 42.

These two devices are disposed coaxial with the principal axis of the driving and driven shaft. The two shafts are separated one from the other by the disc 42 in which the end of the shaft *b* is journalled, an anti-friction ring 45 being provided for this shaft. The disc 42 carries an arbor 66 which is journalled in an opening of the shaft 64 provided with the anti-friction ring 66'. 49 is a lay shaft of an ordinary change speed gear box and carries the wheels 48, 53 and 56.

The transmission element comprises the central pinion 43, a crown 46 with two gears and an internal gear 44. The pinion 47 is keyed to the sleeve which is integral with the internal gear 44 and which sleeve is keyed to the sleeve of the disc 42. The pinion 47 does not mesh directly with the gear 48, but is connected to this gear by means of the internal gear 50 guided in the casing. 53 and 54 indicate the two gears for small speed which do not mesh but are connected by the intermediary of the internal gear 55. The wheel 56 gives reverse drive owing to the fact that it can mesh directly with the wheel 54 when the operating members 57 and 63 bring this wheel in the plane of the wheel 32 by sliding on the shaft 64. An arbor 58 carries the grooved cams which control the movements of the forked levers 63, 59, 60 and 61. The lever 61 controls the direct drive coupling of the ring 45 with the toothed disc 63 of the eccentric core.

The manner of operation of the mechanism is the following:

It is supposed that the energy arrives from the shaft *b* by means of its pinion 43. When the ring 45 and the coupling mechanism 42 are thrown in gear and the mechanism 42' released, the three shafts *b*, 66 and 64 are coupled to direct drive; this is possible owing to the fact that the wheel 54 turns with the disc 42' in the same manner as the pinion 47 turns with the disc 42, namely by means of keys with this difference that the keys of the wheel 54 permit a sliding motion of this wheel relative to its shaft. The clutch 42' being disconnected, the clutch 42' can be thrown in, and a speed is obtained which corresponds to the two reducing ratios between the wheels 47 and 48 and between the wheels 53 and 54. When, without changing anything else, the ring 45 is disconnected, a further reducing ratio is introduced, the one of the transmission element 43, 46, 44. This constitutes then the smallest speed. Finally one can disconnect the clutch 42' and the ring 45 and connect the clutch 42 which gives the speed corresponding to the reduction ratio of the above mentioned transmission element. There can be also obtained a slower reverse speed than the one previously indicated by disconnecting 45, disconnecting 42, and connecting 42' and sliding the wheel 54 until it engages the wheel 56.

It will be understood that the cams can be constructed to produce successively these different results in a given order.

I claim:

1. In a power transmission mechanism having a driving shaft carrying a flywheel, a driven shaft coaxial with the driving shaft, a gear wheel on said driven shaft, a planetary member having a plurality of coaxial planetary gears meshing with said gear wheel on the driven shaft, a plurality of gear wheels adapted to rotate idly about the axis of said two coaxial shafts and geared each with a planetary gear of said planetary member, and means for locking said idle gear wheels against rotation, said flywheel being provided with a plurality of cylindrical cavities adapted to receive said planetary gears and corresponding each in diameter to one of the planetary gears for guiding said gears in their movement of rotation about their axis and compelling the planetary member to follow the movement of the flywheel.

2. In a power transmission mechanism having a driving shaft carrying a flywheel, a driven shaft coaxial with the driving shaft, a gear wheel on said driven shaft, a planetary member having a plurality of coaxial planetary gears, one of the planetary gears meshing with said gear wheel on the driven shaft, a plurality of gear wheels adapted to rotate idly about the axis of said two coaxial shafts and geared each with a planetary gear of said planetary member, said flywheel being provided with a plurality of cylindrical cavities adapted to receive said planetary gears and corresponding each in diameter to one of the planetary gears for guiding said gears in their movement of rotation about their axis and compelling the planetary member to follow the movement of the flywheel, locking means cooperating with each of said idle gear wheels to lock said wheels against rotation, a clutch for connecting the driven shaft to the flywheel, and a rotatable operating shaft for actuating said locking means and said clutch and adapted upon rotation thereof to successively lock either of the idle wheels against rotation while freeing the others and to throw in the clutch while all the idle wheels are free.

3. In a power transmission mechanism having a driving shaft carrying a flywheel, a driven shaft coaxial with the driving shaft, an internal orbit gear on said driven shaft, a planetary member having a plurality of coaxial planetary gears, one of the planetary gears meshing with said orbit gear on the driven shaft, a plurality of idle internal orbit gears meshing each with a planetary gear of said planetary member, and means for locking said idle orbit gears against rotation, said flywheel being provided with a plurality of cylindrical cavities adapted to receive said planetary gears and corresponding each in diameter to one of the planetary gears for guiding said gears in their movement of rotation about their axis and compelling the planetary member to follow the movement of the flywheel.

4. In a power transmission mechanism having a driving shaft carrying a flywheel, a driven shaft coaxial with the driving shaft, an internal orbit gear on said driven shaft, a planetary member having a plurality of coaxial planetary gears, one of the planetary gears meshing with said orbit gear on the driven shaft, a plurality of idle internal orbit gears meshing each with a planetary gear of said planetary member, said flywheel being provided with a plurality of cylindrical cavities adapted to receive said planetary gears and corresponding each in diameter to one of the planetary gears for guiding said gears in their movement of rotation about their axis and compelling the planetary member to follow the movement of the flywheel, locking means cooperating with each of said idle internal orbit gears to lock said gears against rotation, a clutch for connecting the driven shaft to the flywheel, and a rotatable operating shaft for actuating said locking means and said clutch and adapted upon rotation thereof to successively actuate the locking means of all of said idle orbit gears and the clutch whereby one of said orbit gears is locked while the others are free and the clutch is thrown in while all the orbit gears are free.

5. In a power transmission mechanism having a driving shaft carrying a flywheel, a driven shaft coaxial with the driving shaft, a gear wheel on said driven shaft, a planetary member having a plurality of coaxial planetary gears, one of said planetary gears meshing with said gear wheel on the driven shaft, a plurality of gear wheels adapted to rotate idly about the axis of said two coaxial shafts and geared each with a planetary gear of said planetary member, means for locking said idle gear wheels against rotation, said flywheel being provided with a plurality of eccentrically disposed cylindrical cavities adapted to receive said planetary gears and corresponding each in diameter to the diameter of one of the planetary gears for guiding said gears in their movement of rotation about their axis and compelling the planetary member to follow the movement of the flywheel, and circular guides coaxially cut into the material of the flywheel and adapted to support said idle gear wheels.

6. In a power transmission mechanism having a driving shaft carrying a flywheel, a driven shaft coaxial with the driving shaft, an internal orbit gear on said driven shaft, a planetary member having a plurality of coaxial planetary gears, one of the plantary gears meshing with said orbit gear on the driven shaft, a plurality of idle internal orbit gears meshing each with a planetary gear of said planetary member, means for locking said idle orbit gears against rotation, a clutch for connecting the driven shaft to the flywheel, said flywheel being provided with a plurality of eccentrically disposed cylindrical cavities adapted to receive said planetary gears and corresponding each in diameter to the diameter of one of the planetary gears and a plurality of cylindrical hub portions on the flywheel, said hub portions corresponding each in diameter to the internal diameter of one of said idle internal orbit gears to guide these gears in their movement of rotation.

7. In a power transmission mechanism having a driving shaft carrying a flywheel, a driven shaft coaxial with the driving shaft, a pinion fast on the driven shaft, a planetary member having a plurality of coaxial planetary gears, one of the planetary gears meshing with said pinion on the driven shaft, a plurality of idle sun wheels turning around the driven shaft and meshing each with a planetary gear of said planetary member, and means for locking said idle sun wheels against rotation, said flywheel being provided with a plurality of cylindrical cavities adapted to receive said planetary gears and corresponding each in diameter to the diameter of one of the planetary gears, for guiding said gears in their movement of rotation about their axis and compelling the planetary member to follow the movement of the flywheel.

8. In a power transmission mechanism having a driving shaft carrying a flywheel, a driven shaft coaxial with the driving shaft, a pinion fast on said driven shaft, a planetary member having a plurality of coaxial planetary gears, one of the planetary gears meshing with said pinion on the driven shaft, a plurality of idle sun wheels coaxial with said shafts and meshing each with a planetary gear of said planetary member, said flywheel being provided with a plurality of cylindrical cavities adapted to receive said planetary gears for guiding said gears in their movement of rotation about their axis and compelling the planetary member to follow the movement of the flywheel, locking means cooperating with each of said sun wheels to lock said wheels against rotation, a clutch for connecting the driven shaft to the flywheel, and a rotatable operating shaft for actuating said clutch and said locking means and adapted upon rotation thereof to successively actuate the locking means of all of said idle sun wheels and the clutch, whereby one of said sun wheels is locked while the others are free and the clutch is thrown in while all the sun wheels are free.

9. In a power transmission mechanism having a driving shaft carrying a flywheel, a driven shaft coaxial with the driving shaft, a pinion fast on the driven shaft, a planetary member having a plurality of coaxial planetary gears, one of the planetary gears being geared to said pinion on the driven shaft, a plurality of idle sun wheels coaxial with said shafts and geared each to a planetary gear of said planetary member, means for locking said idle sun wheels against rotation, a clutch for connecting the driven shaft to the flywheel, said flywheel being provided with a plurality of eccentrically disposed cylindrical cavities adapted to receive said planetary gears and corresponding each in diameter to the diameter of one of the planetary gears, and with a plurality of centrically disposed cylindrical cavities adapted to receive said idle sun wheels and corresponding each in diameter to the diameter of one of the sun wheels to guide the sun wheels in their movement of rotation.

10. In a power transmission mechanism having a driving shaft carrying a flywheel, a driven shaft coaxial with the driving shaft, a pinion fast on the driven shaft, a planetary member having a plurality of coaxial planetary gears of different diameter one of the planetary gears meshing with said pinion on the driven shaft, a plurality of idle sun wheels meshing each with a planetary gear of said planetary member, each sun wheel having a circular disk rigidly connected thereto, means for selectively locking either of said disks to prevent rotation of the corresponding sun wheel, and clutch means for locking together two of said disks and of said sun wheels to prevent rotation of said planetary member about its axis, said flywheel being provided with a plurality of cylindrical cavities adapted to receive said planetary gears and corresponding each in diameter to the diameter of one of the planetary gears for guiding said gears in their movement of rotation about their axis and compelling the planetary member to follow the movement of the flywheel.

In testimony whereof I affix my signature.

CHARLES EDOUARD HENRIOD.